March 17, 1959     T. C. ESTES     2,878,044
TURNBUCKLE LOCK
Filed Oct. 28, 1957     2 Sheets-Sheet 1
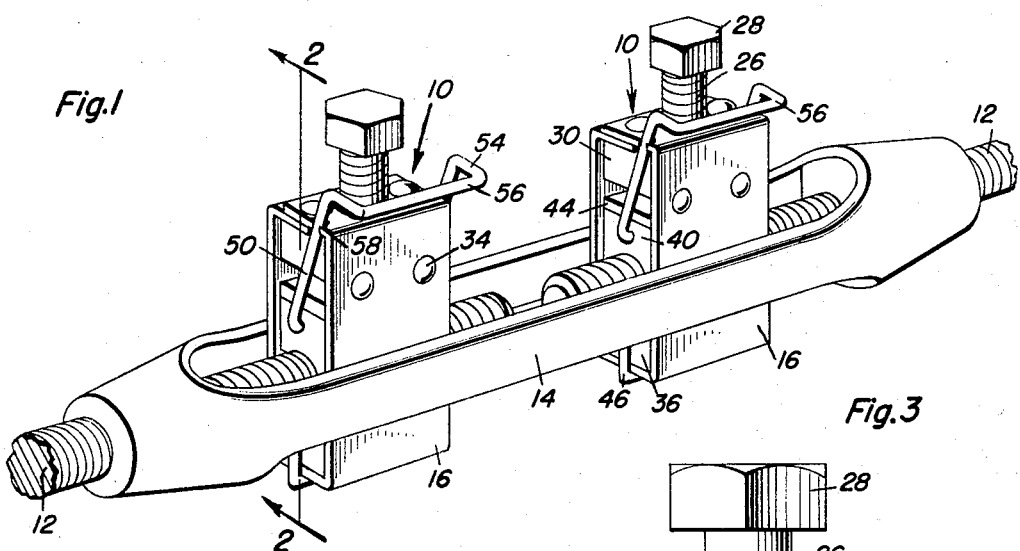
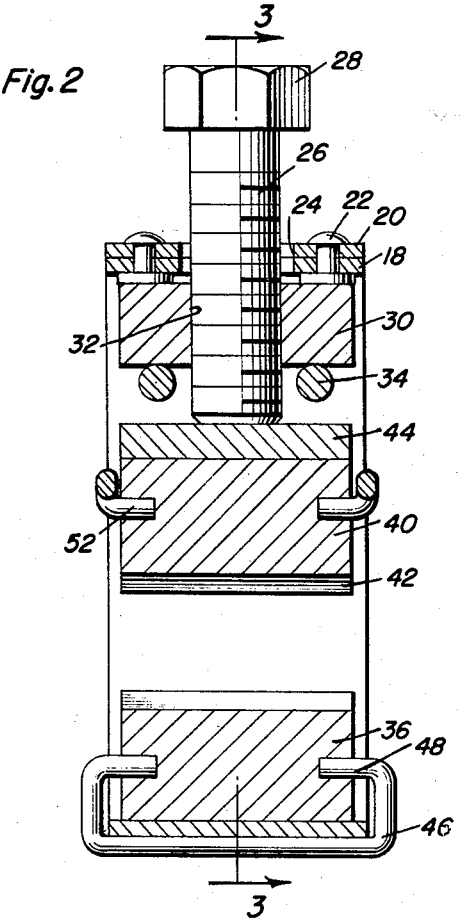
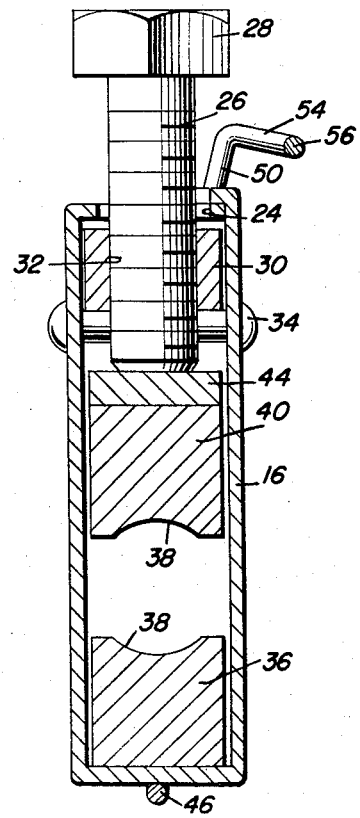
Thomas C. Estes
INVENTOR.
BY *Clarence A. O'Brien*
and *Harvey B. Jacobson*
Attorneys March 17, 1959  T. C. ESTES  2,878,044
TURNBUCKLE LOCK
Filed Oct. 28, 1957  2 Sheets-Sheet 2

Thomas C. Estes
INVENTOR.

BY *Clarence A.O'Brien*
and *Harvey B. Jacobson*
Attorneys

United States Patent Office 2,878,044
Patented Mar. 17, 1959

2,878,044

TURNBUCKLE LOCK

Thomas C. Estes, Dallas, Tex.

Application October 28, 1957, Serial No. 692,769

11 Claims. (Cl. 287—60)

The present invention generally relates to a locking device and more particularly a device for locking a turnbuckle in any desired adjusted position.

Turnbuckles are employed in many orientations generally for the purposes of tightening or shortening the effective length of longitudinally aligned members such as two parts of a steel cable or the like. Turnbuckles are employed in many phases of construction work such as in structural steel frameworks for buildings, bridges and the like. In the construction of building frameworks and the like, it is desirable that turnbuckles be locked to prevent accidental maladjustment thereof. Various primitive methods are employed for this purpose by large construction companies and such methods include the driving of wood wedges between the turnbuckle screws and the turnbuckle yoke or projecting the end of a rod through the yoke between the ends of the screw and letting the other end of the rod rest on the ground 15 or 20 feet away. Where turnbuckles are used in conjunction with steel cables for aligning and guying the framework temporarily until it can be permanently riveted or welded, it is necessary to provide a highly effective lock since the actual turning force applied in tightening the turnbuckle may be very high and the tremendous tension on the cable will sometimes causes the yoke to rotate in a backward direction and if a twist is in the cable at either end of the turnbuckle, the turnbuckle screw at that end of the yoke will back out of the yoke thus reducing the effectiveness of the turnbuckle and permitting movement of the structural member being held in position. Accordingly, it is the primary object of the present invention to provide a turnbuckle lock which will effectively prevent movement of the components of the turnbuckle but yet which may be usually released for use of the turnbuckle in the usual manner.

A further object of the present invention is to provide a turnbuckle lock which is easily manipulated, effective for its particular purposes, long lasting, dependable, simple in construction and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a turnbuckle employing the turnbuckle lock of the present invention on both of the turnbuckle screws;

Figure 2 is a detailed sectional view taken substantially upon a plane passing along section line 2—2 of Figure 1 illustrating the details of construction of the turnbuckle lock;

Figure 3 is a vertical sectional view taken substantially upon a plane passing along section line 3—3 of Figure 2 illustrating further structural details of the turnbuckle lock;

Figure 4:
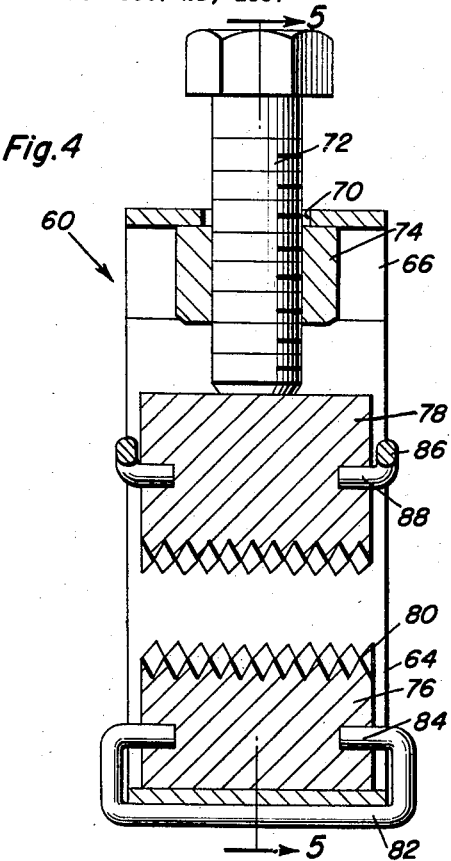
Figure 4 is a sectional view similar to Figure 2 illustrating the details of construction of a modified form of turnbuckle lock.

Referring now specifically to Figures 1-3 of the drawings, the numeral 10 generally designates the turnbuckle lock of the present invention which is adapted to engage the inner ends of the turnbuckle screws 12 and to be disposed within and through the turnbuckle yoke 14. The turnbuckle screws 12 and the turnbuckle yoke 14 are conventional and may be of any conventional construction with the turnbuckle lock of the present invention mounted directly to the inner ends of the turnbuckle screws to prevent relative rotation between the turnbuckle screw 12 and the yoke 14 thus preventing relative longitudinal movement between the turnbuckle screws 12 which are terminally secured to the ends of cables or the like.

The turnbuckle lock 10 includes a generally open ended rectangular frame 16 which may be formed from a piece of strap metal having inturned and overlapping ends 18 and 20 secured together by rivets 22 thus forming a rigid rectangular frame. The overlapping ends 18 and 20 are provided with an aperture 24 for receiving an externally threaded cap screw 26 having a polygonal upper end 28 for reception of a suitable turning wrench. The cap screw 26 is threaded through a nut 30 which may be in the form of a movable block of metal having an internally threaded bore 32 extending therethrough for adjustably receiving the cap screw 26. A pair of transversely extending rivets 34 underlie the nut 30 for retaining the same generally in position and preventing downward movement thereof wherein the cap screw 26 will prevent lateral sliding movement of the nut 30 out of the frame 16 and by rotation of the cap screw 26, the same may be moved inwardly and outwardly in relation to the nut 30.

Disposed in the base or bottom of the frame 16 is a lower clamping block 36 having a recess 38 in the upper surface thereof generally conforming to the contour of the periphery of the turnbuckle screw 12. Disposed above and in opposed relation to the lower clamping block 36 is an upper clamping block 40 having a similar recess 42 therein. The upper clamping block 40 is provided with a backing plate 44 which is adapted to engage the end of the cap screw 26 wherein the cap screw 26 is used for urging the clamping blocks 36 and 40 towards each other for clampingly and lockingly engaging the turnbuckle screw 12 or for permitting outward relative movement thereof for releasing the lock.

A generally U-shaped keeper rod 46 underlies the bottom of the frame 16 and has inturned ends 48 embedded in the lower clamping block 36 for retaining the clamping block 36 in position. A generally U-shaped handle wire 50 extends inwardly from the ends of the frame 16 having the overlapping portions 18 and 20 and terminates in inturned end portions 52 embedded in the upper clamping block 40. The bight portion of the U-shaped handle 50 is offset by offset portions 54 with the bight portion being designated by the numeral 56 thus providing a handle offset from the cap screw 26 for raising the upper clamping block 42 a position out of engagement with the turnbuckle screws 12.

The top of the frame 16 which is constituted by the overlapping end portions 18 and 20 is provided with oppositely disposed semi-cylindrical notches or recesses 58 therein which form a guide for sliding movement of the legs of the U-shaped handle 50 during reciprocation of the upper clamping block 40.

As an example of a practical construction, the frame 16 has been constructed of 12 gauge metal with the rivets 22 being 3/16 inch flat head rivets and the rivets 34 being 1/4 inch rivets. The nut 30 is constructed of metal as is the backing plate 44 which may be bonded to the upper clamping plate 40 or may be merely resting thereon. The clamping blocks 36 and 40 are preferably constructed of a material having a high coefficient of sliding friction and yet would not injure the turnbuckle screw threads under pressure. Such a material is "Bakelite" grade CE having an ultimate compression strength of 41,000 pounds per square inch and an ultimate shear strength of 18,500 pounds per square inch. This material is a phenolic laminate reinforced with heavy weave cotton fabric. Any equivalent material having suitable strength characteristics may be employed whether they are plastic or other materials.

Figure 5:
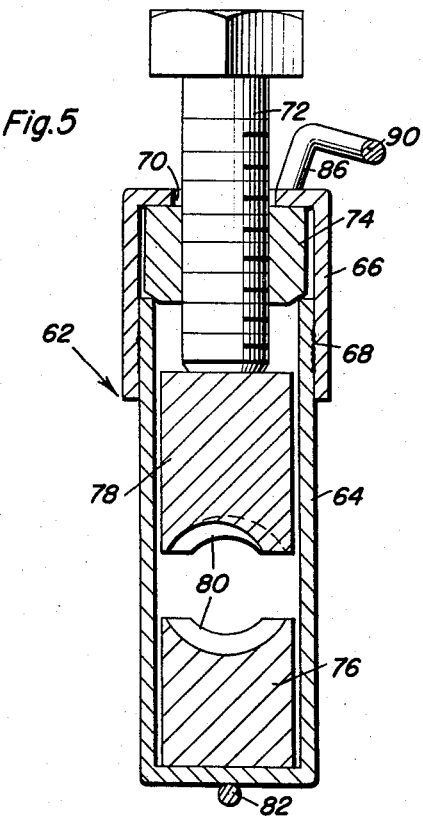
Figure 5 is a sectional view taken substantially upon a plane passing along section line 5—5 of Figure 4 illustrating further details of the form of the invention shown in Figure 4.

Referring now specifically to Figures 4 and 5 of the drawings, the numeral 60 generally designates another form of turnbuckle lock which includes a generally rectangular frame designated in general by the numeral 62 which includes a lower U-shaped section 64 and an upper inverted U-shaped section 66 having the legs thereof overlapping and in telescopic arrangement with the legs of the upper inverted U-shaped member 66 overlying the legs of the lower U-shaped member 64 and being secured thereto as by welding 68.

The bight portion of the upper U-shaped inverted member 66 is provided with an opening 70 receiving the shank of a cap screw 72 which is also screw threaded through a metal nut 74 which is retained between the upper ends of the legs of the lower U-shaped member 64 and the bight portion of the upper U-shaped member 66 substantially as shown in Figure 5 whereby rotation of the nut 74 will be prevented as will longitudinal movement thereof whereby rotation of the cap screw 72 will cause longitudinal movement thereof.

Disposed against the inner surface of the bight portion of the lower U-shaped member 64 is a lower clamping block 76 while slidably disposed in opposed relation to the clamping block 76 is an upper clamping block 78. The clamping blocks 76 and 78 are of metallic construction and provided with segmental threads 80 on the recess in the facing surfaces thereof. The threads 80 are cut so that they will mesh with the threads of the turnbuckle rods or screws. Blocks having right handed threads would be identified from those having left handed threads by some readily discernible means such as by painting the same distinctively such as by painting the blocks with right handed threads green and the blocks with left handed threads red.

A substantially U-shaped keeper wire 82 is provided under the bottom of the frame 64 and has inturned ends 84 received and projecting into the lower clamp block 76. A generally U-shaped wire handle 86 provided with inturned lower ends 88 is connected to the upper clamping block 78 and extends upwardly and terminates in an offset bight portion 90 in substantially the same manner as the construction shown in Figures 1–3 for the same purpose, that is, the lifting and guiding of the movement of the upper clamp block 78 while the lower keeper 82 retains the lower clamp block 76 in desired position within the frame 64.

Figure 6:
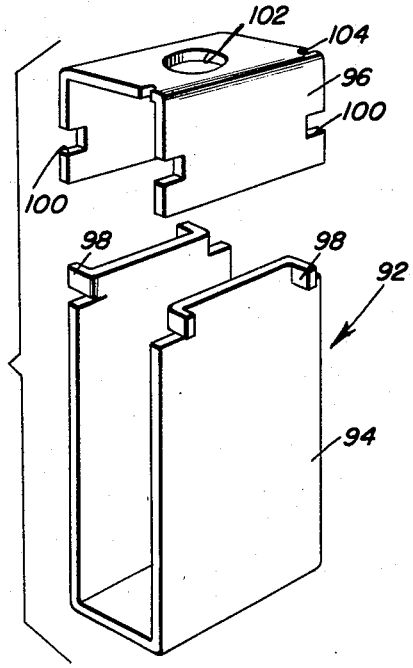
Figure 6 is an exploded group perspective view of a modified form of frame for the turnbuckle lock.
Figure 7:
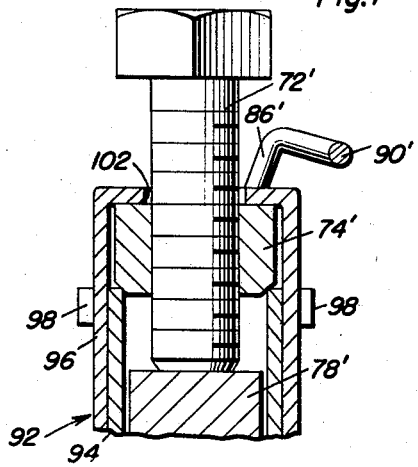
Figure 7 is a detailed fragmental sectional view illustrating the turnbuckle lock employing the frame construction of Figure 6.

Referring now specifically to Figures 6 and 7, the numeral 92 generally designates a modified form of frame construction which may be employed in lieu of the frame 62 in Figures 4 and 5. This frame construction 92 includes a lower U-shaped member 94 and an upper inverted U-shaped member 96 having the legs thereof in telescoping overlying relation to the legs of the lower U-shaped member.

The upper ends of the legs of the lower U-shaped member 94 are provided with outwardly struck lugs 98 which are formed by severing the metal along a horizontal line and forcing the same outwardly in perpendicular relation to the plane of the leg of the U-shaped member 94. Each leg of the inverted U-shaped member 96 is provided with a pair of oppositely facing notches 100 therein with the notches being spaced for receiving the lugs 98. The distance between the inner edges of the notches 100 is substantially equivalent to the distance between the inner surfaces of the lugs 98 thus permitting interlocking engagement of the lugs 98 with the notches 100 when the legs of the U-shaped member 94 are squeezed together and then inserted up into the U-shaped member 96 and released thus permitting the resiliency of the U-shaped member 94 to urge the lugs 98 into engagement with the notches 100 thus securing the two parts of the frame 92 together. The other components of the turnbuckle lock using the frame 92 would be the same as those used in Figures 4 and 5 and include the cap screw 72', the nut 74', the upper clamp block 78', the U-shaped handle 86' and the offset bight portion or handle 90' wherein the device operates in the same manner as in Figures 4 and 5. It is noted that the bight portion of the U-shaped member 96 is provided with an opening 102 for receiving the cap screw 72' and the side edges thereof are provided with notches 104 for receiving the U-shaped handle 86'.

The arrangement illustrated in Figures 6 and 7 is adapted for use in certain orientations where it may be impossible to position the rectangular frame over the end of the turnbuckle screw or rod wherein the looseness or fit of the nut 74' will permit the inward springing movement of the legs of the U-shaped member 94 at any time when the cap screw 72' is loosened.

All three forms of the invention operate in substantially the same manner whereby the upper and lower clamping blocks are brought into frictional engagement with the threads of the turnbuckle rod or screw by virtue of tightening down on the cap screw. In Figures 1–3, the clamping blocks are made of a material having a high coefficient of friction but being constructed so that they will not damage the threads of the turnbuckle rods. In the devices of Figures 4–7, the clamping blocks are constructed of threads which will mesh with the threads of the turnbuckle rods thus preventing damage thereto.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a turnbuckle having a yoke with parallel side members and threaded end portions and longitudinally extending threaded rods therein, a turnbuckle lock comprising a generally rectangular frame having open ends for permitting the frame to be disposed in encircling relation to the turnbuckle threaded rod with the frame being received within the yoke with the sides of the frame adjacent the side members, a lower clamp block mounted in said frame, an upper clamp block movably mounted in said frame, and means extending through one end of said frame for engagement with one of said clamping blocks for moving the clamping blocks towards each other for clampingly engaging the threaded inner end of the turnbuckle rod thereby locking the frame to the rod and preventing rotation of the rod due to engagement between the side members of the yoke and the frame.

2. The combination of claim 1 wherein said means extending through the end of the frame includes a cap screw, a nut captively retained within said frame whereby rotation of the cap screw will cause longitudinal movement of the cap screw, said cap screw having an inner end in engagement with the upper clamp block for urging the upper clamp block towards the lower clamp block.

3. The combination of claim 2 wherein said upper clamp block is provided with a U-shaped handle which guides the vertical reciprocation of the upper clamp block and also provides a handle for moving the upper clamp block in relation to the lower clamp block for permitting freedom of movement of the turnbuckle lock along the length of the turnbuckle rod when the cap screw is loosened.

4. The combination of claim 2 wherein said frame incorporates a pair of facing U-shaped members having the legs thereof in telescopic engagement, said telescoping legs being rigidly and permanently secured to each other.

5. The combination of claim 2 wherein said frame includes a pair of U-shaped members having the legs telescopically and detachably connected for permitting disassembly of the frame and the lower clamp block in relation to the upper clamp block for permitting lateral disassembly of the lock in relation to the turnbuckle rod.

6. The combination of claim 2 wherein the upper and lower clamping blocks are constructed of a material having a high coefficient of friction and being sufficiently soft to rigidly clamp the screw threads on the turnbuckle rod without damage thereto.

7. The combination of claim 2 wherein said upper and lower clamping blocks are constructed of metallic material and provided with segmental threads in the facing surfaces thereof for meshing and clamping engagement with the threads of the turnbuckle rod thus preventing damage to the threads of the turnbuckle rod.

8. The combination of claim 2 wherein said nut is held captive by a pair of transverse rivets extending across said frame in spaced relation to the top.

9. The combination of claim 2 wherein said nut is held captive between a shoulder within said frame and the upper end of said frame.

10. The combination of claim 2 wherein the upper end of said frame is provided with a pair of oppositely disposed notches, a U-shaped handle pivotally attached to the upper clamp block with the legs thereof slidably received in the notches for guiding and limiting the movement of the upper clamp block.

11. A device for preventing relative rotation between two threadedly engaged members with one of said members having a side member generally extending alongside the other member in spaced relation thereto, said device comprising an open frame for positioning over the end of said other member with a portion of the frame adapted to engage the side member, a first clamp block carried by said frame, a second clamp block movably carried by said frame, said blocks having concave facing surfaces for engaging opposite surfaces of the said other member, a handle member of U-shaped configuration pivotally attached to said second clamp block, said frame having a pair of notches in the end thereof remote from the first clamp block, the legs of said handle member being slidably disposed in the notches for guiding the movement of the second clamp block, the bight portion of the handle member being disposed in spaced relation to the end of the frame and forming a handle for manipulating the second clamp block, and a threaded screw member carried by the frame with the inner end thereof engaging the second clamp block for urging the second clamp block towards the first clamp block for rigidly clamping the frame to the said other member with the engagement of the frame with the side member on said one member preventing relation rotation between the threadedly engaged members.

References Cited in the file of this patent
UNITED STATES PATENTS

| | | |
|---|---|---|
| 854,512 | Mapes | May 21, 1907 |
| 1,444,517 | Moyer et al. | Feb. 6, 1923 |
| 1,632,480 | Hunt et al. | June 14, 1927 |